May 5, 1953          T. W. MOORE          2,637,825
DYNAMOELECTRIC MACHINE
Filed March 24, 1949          2 SHEETS—SHEET 1
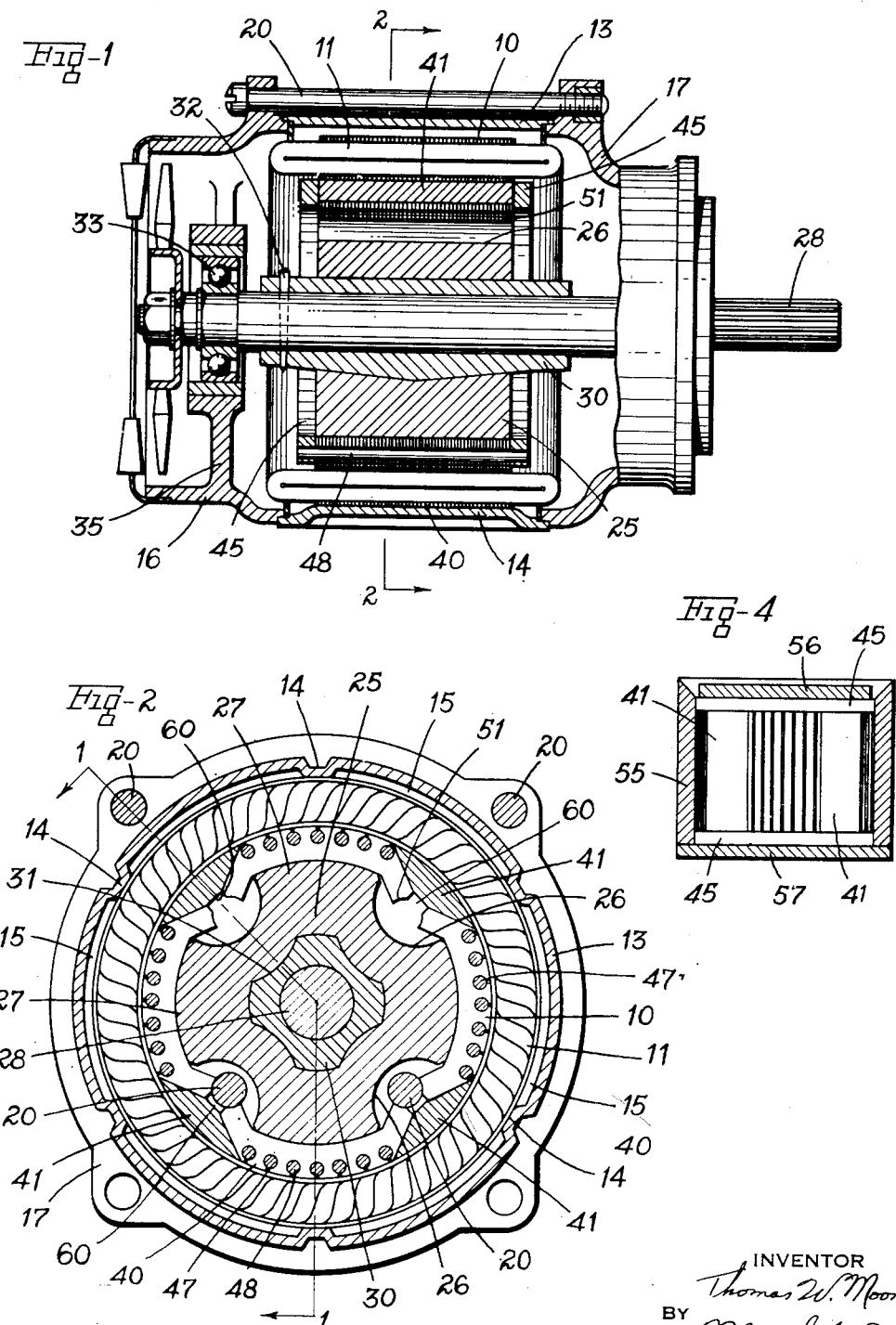
INVENTOR
Thomas W. Moore
BY
Marechal & Biebel
ATTORNEYS

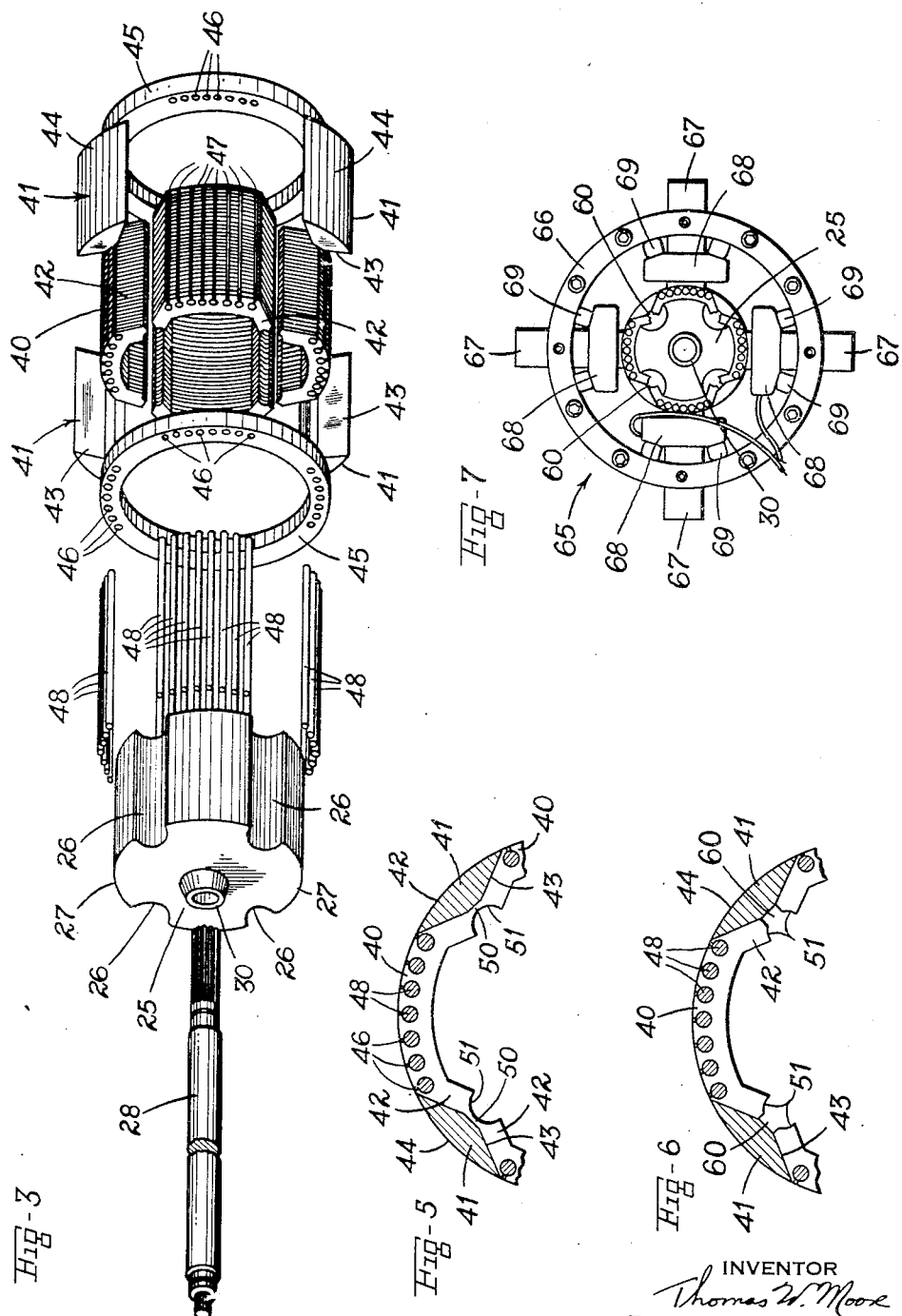

Patented May 5, 1953

2,637,825

UNITED STATES PATENT OFFICE 2,637,825

DYNAMOELECTRIC MACHINE

Thomas W. Moore, Dayton, Ohio, assignor, by mesne assignments, to American Machine & Foundry Company, New York, N. Y., a corporation of New Jersey Application March 24, 1949, Serial No. 83,260

18 Claims. (Cl. 310—156)

This invention relates to dynamoelectric machines and more particularly to such machines employing permanent magnets.

The advantages of permanent magnets for the fields of dynamoelectric machines are well understood, particularly with regard to freedom from the need for any exciter, the absence of windings, connections, slip rings, etc. However even with the use of magnetic alloys of high retentivity, it has been found difficult to develop sufficient magneto-motive force without a relatively large and correspondingly heavy magnetic structure, and because of the low tensile strength of such alloys, even a low speed of rotation has been found to produce centrifugal forces sufficient to burst the magnet unless it is adequately reinforced or protected. In many cases the highly crystalline structure of such magnet material and the shrinkage stresses resulting from its cooling combine to cause minor cracks within the magnet and as a result the tensile properties are uncertain and unreliable although the compressive and magnetic characteristics are largely unimpaired.

It is also a characteristic of the high retentivity or high energy product alloy magnet materials that while the magnet may be magnetized to a high degree from an external source, if the low reluctance flux path is interrupted even momentarily, the magnet will suffer a distinct loss of magnetism, which it cannot itself regain even though the low reluctance path be subsequently restored. Thus when the magnet is placed in a magnetizing device, it may be magnetized to a high degree, but immediately upon removal from the magnetizing device, and while it is being transferred to the stator in which it is to operate, this substantial loss of magnetization will occur, and when in place in the stator it will be found that its magnetism is substantially less than it was upon its initial magnetization. On the other hand, if a continuous low reluctance path be maintained, the magnet will retain its high degree of magnetization indefinitely, and thus provide for developing a correspondingly higher voltage output.

It is the purpose of the present invention therefore to provide a permanent magnet rotor for a dynamoelectric machine which employs a high magnetic retentivity alloy such as an iron-nickel-aluminum alloy of relatively low inherent tensile strength which is received within a laminated structure or cage of high strength, such cage having magnetic properties on the portions opposite the poles of the magnet and non-magnetic properties in the inter-pole areas, the overall structure being such that adequate strength is provided to allow the rotor to be rotated at speeds greatly in excess of those at which the magnetic alloy itself would fail under centrifugal force. The invention also provides a structure which may be magnetized in a suitable fixture to a high degree, and while the magnetizing force is still applied, keeper bars are inserted in areas provided between the poles and inwardly of the outer circumference to form a direct low reluctance path for by-passing the flux from one pole to the other. The rotor with such keeper bars in place is then withdrawn and may be placed in the stator in which it is to operate. Once in position, the stator iron itself forms a low reluctance path for the flux, and the keeper bars may then be removed. This makes it possible to magnetize the magnet to a high degree, and to retain high magnetization throughout the placing of the rotor in the stator, and during any subsequent removal of the rotor theerfrom which may be necessary during use of the machine, thus making possible a substantially higher energy output from a given machine than could be obtained otherwise. Further, the magnetic characteristics are such that it is only when the keeper bars are in place in the rotor that the rotor can be freely withdrawn from the stator, the magnetic pull in the absence of the keeper bars being such as to strongly retain the rotor in position, and thus tending to avoid accidental withdrawal without properly placing the keeper bars in position.

It is accordingly one of the principal objects of the present invention to provide a permanent magnet rotor for a dynamoelectric machine which is easy and economical to manufacture, which has adequate strength to withstand the centrifugal forces effective thereon at high speeds, and which is of such structural characteristics as to be capable of retaining a high degree of the magnetism during transfer from a magnetizing device to the stator of the dynamoelectric machine and during operation therein.

Another object of the invention is to provide a simple and efficient method of manufacturing a permanent magnet rotor which will maintain a high degree of permanent magnetism in the rotor as well as imparting adequate strength thereto for effective operation at high rotational speeds.

It is also an object of the invention to provide a dynamoelectric machine wherein the stator includes removable parts which are adapted to serve as keeper bars for insertion in the rotor for preventing loss of permanent magnetism by the rotor during assembly or disassembly of the machine.

It is a further object to provide such a machine in which there is no direct magnetic connection between adjacent poles except that of the normal and unavoidable leakage paths, the leakage flux however being greatly reduced.

Other objects and advantages of the invention will be apparent from the following description, the accompanying drawings and the appended claims.

In the drawings:

Fig. 1 is a view in longitudinal section of a dynamoelectric machine constructed in accordance with the invention, the view being taken substantially on the line 1—1 of Fig. 2;

Fig. 2 is a section on the line 2—2 of Fig. 1 showing two of the stator bolts mounted in the casing and the other two stator bolts inserted in the rotor and with the stator core and winding shown in elevation;

Fig. 3 is an exploded perspective view of the rotor of Figs. 1 and 2;

Fig. 4 is a somewhat diagrammatic sectional view illustrating the step of brazing together the component parts of the rotor jacket or cage;

Fig. 5 is a fragmentary view in radial section showing the rotor cage following the brazing operation of Fig. 4;

Fig. 6 is a view similar to Fig. 5 showing the rotor cage following removal of the bridging portions between adjacent pole extensions; and Fig. 7 is a somewhat diagrammatic view illustrating the operation of magnetizing the rotor in a magnetizing device.

Referring to the drawings, which illustrate a preferred embodiment of the present invention, the dynamoelectric machine is shown in Figs. 1 and 2 as including a laminated stator core 10 of magnetic material provided with the usual windings 11. The core 10 is mounted in a casing which includes an annular shell portion 13 having inwardly extending ribs 14 which engage and retain the core 10 to leave air passages 15 extending lengthwise of the casings between these ribs. The casing shell 13 is in turn mounted between end members 16 and 17 which are held together by four elongated bolts 20.

The rotor for this machine includes a core portion 25 formed of a high energy product (i. e. the product of the remnant flux and the coercive force required to cancel the remnant flux) magnetic alloy such as an iron-nickel-aluminum alloy of the type commercially available for this purpose. The magnet 25 has spaced grooves or passages 26 which form recesses extending axially along its outer surface to leave a plurality of salient pole portions 27, four being shown. In order to secure the permanent magnet 25 to the rotor shaft 28, the magnet is shown as cast on a steel sleeve 30 of non-circular shape in section to provide a secure connection to the magnet. As shown in Figs. 1 and 2, the sleeve 30 has an outline in side elevation which consists of two frusto-conical portions with their bases together, and the surface of the sleeve has angularly spaced, axially extending grooves 31 into which the magnetic material of magnet 25 is cast. These grooves thus cooperate with the material cast therein to prevent relative rotation of the sleeve and magnet, and the frusto-conical configuration of the sleeve similarly locks it against axial movement in the magnet. Sleeve 30 may be force fitted on shaft 28 or otherwise secured thereto, as by the pin 32 indicated in Fig. 1, and the shaft is in turn mounted in the stator in any suitable way, as by the means of the bearing 33 and integral web portion 35 of the end member 16 of the stator casing.

Rotor magnet 25 is provided with an annular jacket or cage which includes laminations of a suitable magnetic material such as steel. These laminations are formed to provide pole extensions 40 opposite and in alignment with the respective poles 27 of the magnet. The sectors between the pole extensions 40 are filled in with preformed non-magnetic bars 41 of chromium bearing copper or the like. These bars 41 may have a tensile strength comparable with that of the steel portions 40 and also have high electrical conductivity and thus function as a short circuited turn around the pole face, tending to maintain uniform flux through the pole face.

The pole extensions 40 each include side portions 42 which extend inwardly to fit within the grooves 26 in magnet 25, and bars 41 have beveled inner surfaces 43 which are secured to the side portions of the pole extensions, the outer surface 44 of each bar 41 being cylindrically curved to complete the cylindrical outer surface of the rotor. The rotor cage also includes end rings 45 of chromium bearing copper, and these rings are drilled as shown at 46 and the pole extensions 40 are correspondingly drilled and slotted as shown at 47 to receive the copper amortisseur bars 48 which form a short-circuited winding across the face of the rotor. The design of the pole face may advantageously be such that maximum cross sectional area is allotted to the distributed winding 47. This also involves highly saturating the magnetic sections between the conductors comprising the squirrel cage winding, the saturation of such sections providing additional stability to the wave form and further reducing the effects of stator fluxes and magneto-motive forces on the permanent magnet proper.

Figs. 4 to 6 illustrate different operations and stages in the manufacturing of this cage for the magnet 25. As shown in Fig. 5, the individual laminations of which the cage is composed are initially in annular form and include all the pole extensions, the side portions 42 of adjacent pole extensions being connected by integral bridging portions 50, and it will also be noted that the inner edges of the laminations have cylindrically curved seats or recesses 51 therein adjacent each bridging portion 50 and reducing the width thereof. In forming the cage, these laminations are assembled in a stack as shown in Fig. 4 with the bars 41, the end rings 45 and the amortisseur bars 48 in a brazing fixture comprising a cylindrical shell 55 and top and bottom plates 56 and 57. The upper edge of shell 55 is beveled outwardly to provide with the top plate 56 a funnel-like annular opening into which a suitable brazing compound may be poured to secure all of these parts of the cage together.

It will be seen that the brazing takes place along an inclined plane such that the brazed joint is subjected largely to shear, the area in shear being thus sufficiently great to be comparable in strength with the area of the pole pieces inwardly of the cross bars 48. This construction tends to maintain a consistent stress condition in the cage and avoids local stress concentrations. At the same time the contours of the pole face are such as to reduce undesirable interpole stator leakage, and since the magnetic pole faces do not terminate abruptly, facilitates the development of a desirable wave form.

Fig. 5 shows the appearance of the cage following this brazing operation, with the bars 41 secured to the side portions 42 of the pole extensions but with the bridging portions 50 still intact, and the assembly is then heat treated to develop the maximum strength in the copper alloy parts. The bridging portions 50 are then milled or ground away to provide air gaps 60 between the side portions 42 of adjacent pole extensions 40, and also any excess brazing material on the inner surface of the cage is removed. Fig. 6 shows the appearance of the cage after these operations, and it will be noted that adjacent pole extensions 40 are entirely separate from each other magnetically and are maintained with their adjacent side edges in spaced relation across the gaps 60 by means of the non-magnetic bars 41. The cage is then mounted on magnet 25 in proper relation thereto, with the side portions 42 of the pole extensions being received in the outer portions of the grooves 26 in the magnet. The cage may be readily secured to the magnet by being heated and shrunk thereon, and the completed structure is turned to finished dimensions before being magnetized and mounted in the stator.

Fig. 7 illustrates the operation of magnetizing the rotor in a magnetizing device 65, which is shown as an annular frame 66 having four radially arranged salient poles 67 mounted therein and provided with windings 68 and wooden spacer blocks 69. To magnetize the rotor, it is inserted in the device 65 as shown in Fig. 7, and current is applied to the magnetizing device. Preferably the poles 67 of the magnetizing device are placed in direct contact with the pole extensions 40 of the rotor to provide a minimum reluctance path during the magnetizing operation.

If the rotor is simply removed from the magnetizing device, as is necessary in transferring it to its working position in the stator, it suffers a marked and quite substantial decrease in its degree of magnetization. Assuming, by way of example, a magnetic material which can be magnetized to a peak condition of the order of 80,000 lines per square inch following the complete removal of the rotor from the magnetizing device in the absence of the maintenance of a low reluctance path for the flux, the magnet may lose as much as 50 per cent of its magnetism, so that when reinserted in the stator, it is magnetized only to a level of about 40,000 lines per square inch. Even though the stator then forms a relatively low reluctance path, the magnet does not regain any magnetism which is lost during its period of transfer when there was no complete low reluctance flux path, however short that period may have been.

In accordance with the present invention, however, a low reluctance path is established for the flux prior to withdrawal of the rotor from the magnetizing fixture, and while there may be some loss of magnetism because of saturation in this flux-by-pass circuit, the magnet retains a much higher level of flux density than when it is simply removed from a magnetizing device without providing such a by-pass circuit.

When the rotor is then placed in the stator, this by-pass circuit is discontinued, and the flux traverses the air gap between the rotor and the stator and the magnetic circuit of the stator. The presence of the air gap interposes a short high reluctance path for the flux which, however, is necessary for the operation of the machine, and while it results in some loss of permanent magnetism, a flux density is nevertheless retained which is still substantially above that which would result from the direct transfer of the rotor from the magnetizing device in the absence of the by-pass circuit. For example a magnetism of the order of 75,000 to 78,000 lines per square inch has been successfully maintained, representing a substantial increase above the 40,000 lines per square inch density obtainable in the absence of the use of the by-pass circuit.

This result is accomplished by temporarily inserting removable keeper bars of magnetic material in the grooves 26 between the side portions 42 of adjacent pole extensions 40 to form a flux by-pass between adjacent pole extensions, and a simple and effective form of keeper bar is provided by the steel stator bolts 20. Thus as shown in Fig. 1, the stator casing is so designed that the bolts 20 are somewhat longer than the rotor, and also the diameter of these bolts is correlated with the dimensions of the rotor to provide for free insertion of the bolts in the grooves 26 in contact with the side portions 42 of the pole extension which extend into each of these grooves. Satisfactory results from this standpoint have been obtained from the notches 51 in the cage curved about a radius slightly larger than that of the bolts, for example a radius of $^{11}/_{64}$ inch when the bolts 20 are $^{1}/_{6}$ inch in diameter, to provide working clearance while assuring adequate areas of contact between the bolts and the walls of recesses 51.

With this construction, the bolts 20 are inserted in grooves 26 following the magnetizing operation and before the rotor is removed from the magnetizing device. Thereafter during transfer of the rotor to the stator, the bolts will be magnetically held in contact with the curved recesses 51 of the side portions of adjacent pole extensions to form a flux by-pass therebetween, but after the rotor has been mounted in the stator, the magnetic flux will also flow through the stator, and the bolts can be readily removed and mounted in proper position to hold the stator casing together. This stage in the assembly of the machine is illustrated in Fig. 2, which shows two of the bolts already in the casing while the remaining two bolts are still inserted in the rotor.

In this way the removal of the rotor from the stator is rendered simple and easy, avoiding the necessity to exert the substantial force which would be otherwise required to pull the rotor out.

In the operation of this dynamoelectric machine, the rotor cage serves as an effective reinforcing means for the permanent magnet 25, which is relatively brittle and incapable when unsupported of withstanding the centrifugal forces effective thereon at high speeds, and it is thus practicable to operate the machine efficiently at high speeds, for example within a range up to speeds of the order of 12,000 to 15,000 R. P. M. The bars 41 are of high tensile strength and thus add substantial mechanical strength to the cage as well as supplementing the short-circuiting effect of the amortisseur bars 47, and the end rings 45 also add strength to the cage and thus to the rotor as a whole. In addition, the construction of the rotor as described which provides for the use of removable keeper bars is particularly advantageous in maintaining the maximum degree of permanent magnetism in the rotor for efficient operation, and this result is facilitated by the design of the machine as a whole which makes available the stator bolts for use as the keeper bars during assembly or disassembly of the machine. It will also be seen that these practical advantages are obtained in a construction which is relatively easy and economical to produce, requiring only simple fabricating operations.

The invention also provides for avoiding the objectionable demagnetizing effects resulting from transient load currents in the stator winding, further assuring the maintaining of a high level of magnetization in the permanent magnet. The effect of a substantial transient current in the stator is to create a counter-magnetomotive force which opposes the permanent magnetism of the rotor, and may be considered as having an effect similar to an increase in the reluctance of the flux path. The effect of this demagnetizing force may be lessened by the provision of the limited air gaps 60 between adjacent arms 42 of the pole extensions, each gap 60 being of such length and area as shown that it maintains the magnetic circuits of adjacent poles separate and does not result in any substantial leakage during normal operation of the machine but does provide a leakage path for the passage of a portion of the flux when there is a strong or abnormal counter-magnetomotive force, such as the conditions described above. This flux leakage path thus serves to maintain the total flux through the permanent magnet at a relatively high level, notwithstanding the presence of a high counter-flux in the stator. The size of the air gaps 60 may be selected as desired to produce desired operating characteristics.

While the method and form of apparatus herein described constitute preferred embodiments of the invention, it is to be understood that the invention is not limited to this precise method and form of apparatus, and that changes may be made therein without departing from the scope of the invention which is defined in the appended claims.

What is claimed is:

1. A rotor adapted for use in a dynamoelectric machine having a stator comprising a permanent magnet, pole extensions of magnetic material in contact with the poles of said magnet, means maintaining said pole extensions in circumferentially spaced relation with each other to form gaps defining paths of substantially higher reluctance than the reluctance of the air gap between said rotor and the stator in said machine, means defining air gaps extending axially through said rotor within the outer circumference thereof and radially inwardly of said high reluctance paths in continuous relation with the ends of adjacent said pole extensions, and keeper bars of magnetic material adapted to be removably received in said air gaps in flux by-passing relation with adjacent said pole extensions to complete the magnetic circuit within said rotor.

2. A rotor adapted for use in a dynamoelectric machine having a stator comprising a permanent magnet, pole extensions of magnetic material in contact with the poles of said magnet, means maintaining said pole extensions in circumferentially spaced relation with each other to form paths between each other of substantially higher reluctance than the reluctance of the air gap between said rotor and the stator in said machine, said paths extending axially through said rotor within the outer circumference thereof, the adjacent faces of said pole extensions being shaped to form recesses extending axially through said rotor within the outer circumference thereof, and keeper bars of magnetic material adapted to be removably received in said recesses in flux by-passing relation with adjacent said pole extensions to complete the magnetic circuit within said rotor.

3. A rotor adapted for use in a dynamoelectric machine having a stator, comprising a permanent magnet having salient poles, a circumferentially continuous cage surrounding said magnet and including pole extensions of magnetic material secured to said magnet in circumferentially spaced relation and magnetically separate from each other to form gaps of substantially higher reluctance than the reluctance of the air gap between said rotor and the stator in said machine, said magnet having axially extending grooves in the surface thereof between adjacent pole salients and radially inwardly of said cage, said pole extensions projecting partially inwardly of said grooves and cooperating therewith to receive keeper bars of magnetic material in flux by-passing relation with said adjacent edges of said pole extensions for completing the magnetic circuit within said rotor to prevent loss of magnetism when said rotor is not in said stator.

4. A rotor adapted for use in a dynamoelectric machine having a stator comprising a permanent magnet, pole extensions of magnetic material secured to said magnet in circumferentially spaced relation to form gaps of substantially higher reluctance than the reluctance of the air gap between said rotor and the stator in said machine, said pole extensions having inwardly inclined portions on the outer surfaces thereof adjacent the side edges thereof, complementarily shaped bars of non-magnetic material secured to said inclined portions of adjacent pole extensions and extending axially of said rotor to maintain adjacent said pole extensions in said spaced relation, said magnet having axially arranged passages in the surface thereof underlying the spaces between adjacent edges of said pole extensions for receiving keeper bars of magnetic material to form a flux by-pass between adjacent said pole extensions for completing the magnetic circuit within said rotor.

5. A rotor for a dynamoelectric machine comprising a permanent magnet core of high energy product having a plurality of salient poles with recesses therebetween, a cage completely surrounding the periphery of said core in the form of laminations of high strength magnetic material overlying each of the pole salients and forming pole extensions therewith, adjacent pairs of said pole extensions having portions inclined inwardly and projecting toward each other in circumferentially spaced relation to leave an air gap therebetween, and preformed solid bars of non-magnetic material bonded to the sides of said pole extensions in radially overlying relation with said air gaps to form a complete uniform circumference for said cage developing high strength throughout the periphery thereof, said bars having inclined surfaces complementary to and bonded directly to said inclined portions of said pole extensions to provide bonded areas subject to shear forces in the operation of said rotor and with said bonded areas being of substantial size providing strength therein comparable with said pole extensions to maintain a consistent stress condition in said cage avoiding local stress concentrations.

6. A rotor adapted for use in a dynamoelectric machine having a stator comprising a permanent magnet, an annular cage mounted on said magnet and formed of alternate non-magnetic portions and magnetic portions forming pole extensions, said rotor having air gaps of substantial angular extent extending axially therethrough between adjacent said pole extensions and radially inwardly of said non-magnetic portions to form paths of substantially higher reluctance than the reluctance of the air gap between said rotor and the stator in said machine and keeper bars of magnetic material adapted to be removably received in said air gaps in flux by-passing relation with adjacent said pole extensions to complete the magnetic circuit within said rotor in the absence of an external magnetic circuit therefor.

7. A rotor for a dynamoelectric machine comprising a permanent magnet core of high energy product and having a plurality of salient poles with recesses therebetween, a cage completely surrounding the periphery of said core in the form of laminations of high strength magnetic material overlying each of said salient poles and forming pole extensions therewith, said pole extensions having portions inclined inwardly and projecting toward each other at a relatively shallow angle with respect to each other and in circumferentially spaced relation to leave an air gap therebetween, bars of non-magnetic material bonded to the outer surfaces of said inclined portions of said pole extensions over a substantial area thereof and having outer surfaces in the circumference of said pole extensions, and keeper bars of magnetic material adapted to be removably received in said air gaps in flux by-passing relation with adjacent said pole extensions to complete the magnetic circuit within said rotor.

8. A dynamoelectric machine of the character described comprising a stator having a winding, a rotor mounted for rotation within said stator and including a permanent magnet, pole extensions of magnetic material secured to said magnet in circumferentially spaced relation, the side edges of said pole extensions and said magnet having cooperating portions forming air gaps extending axially through said rotor between each adjacent pair of poles and forming paths of substantially higher reluctance than the reluctance of the air gap between said rotor and said stator, end members for said stator, and bars of magnetic material for connecting said end members together, each said bar being of such dimensions as to be received in one of said air gaps in contact with adjacent said pole extensions to form a flux by-pass therebetween for completing the magnetic circuit within said rotor independently of said stator.

9. A dynamoelectric machine of the character described comprising a stator having a winding, a rotor mounted for rotation within said stator and including a permanent magnet, pole extensions of magnetic material secured to said magnet in circumferentially spaced relation, the side edges of adjacent said pole extensions having surfaces circumferentially curved about the same axis, end members for said stator, and cylindrical bars of magnetic material for connecting said end members together, each said bar being removably receivable in the space defined by said curved surface portions and in contact with each thereof to form a flux by-pass between adjacent said pole extensions for completing and maintaining the magnetic circuit internally of said rotor in the absence of an external magnetic circuit therefor.

10. A dynamoelectric machine of the character described comprising a stator having a winding, a rotor mounted for rotation within said stator and including a permanent magnet and an annular cage mounted on said magnet and formed of alternate nonmagnetic portions and magnetic portions forming pole extensions magnetically separated from each other by air gaps, end casing members for said stator, and bars of magnetic material for connecting said end members together, each said bar being of such dimensions as to be received in one of said air gaps in contact with adjacent said pole extensions to form a flux by-pass therebetween for completing the magnetic circuit within said rotor independently of said stator.

11. In a method of manufacturing a rotor for use in a dynamoelectric machine having a stator, the steps of securing pole extensions of magnetic material to a permanent magnet having a high magnetic retentivity during the continuance of a low reluctance magnetic path and having substantially reduced retentivity upon the interruption of such path with adjacent edges of said pole extensions in circumferentially spaced relation to provide air gaps therebetween, magnetizing the resulting structure in a magnetizing device, then inserting keeper bars of magnetic material between adjacent said pole extensions in flux by-passing relation therewith while said rotor is in said magnetic device to complete the magnetic circuit within said rotor, and removing said rotor from said magnetic device with said keeper bars in place.

12. In a method of manufacturing a rotor for use in a dynamoelectric machine having a stator, the steps of securing pole extensions of magnetic material to a permanent magnet having a high magnetic retentivity during the continuance of a low reluctance magnetic path and having substantially reduced retentivity upon the interruption of such path with adjacent edges of said pole extensions in circumferentially spaced relation to provide air gaps therebetween, magnetizing the resulting structure in a magnetizing device, then inserting keeper bars of magnetic material in the air gaps between adjacent said pole extensions in flux by-passing relation therewith while said rotor is in said magnetic device to complete the magnetic circuit within said rotor, transferring said rotor from said magnetic device to said stator with said keeper bars in place, and thereafter removing said keeper bars.

13. In a method of manufacturing a rotor for use in a dynamoelectric machine having a stator, the steps of forming a plurality of individual annular laminations of magnetic material each including a plurality of pole extensions connected by integral bridging portions each located radially inwardly of the outer circumference of said pole extensions, securing a plurality of said laminations together in stacked relation with said bridging portions forming axially arranged indentations in the circumference of said stack, bonding axially extending bars of non-magnetic material to adjacent said pole extensions within said indentations in overlying relation with said bridging portions, removing said bridging portions to leave said pole extensions connected in spaced relation by said bars, and assembling said stacked laminations upon a permanent magnet having salient holes with said bridging portions located in the spaces between said holes.

14. In a method of manufacturing a rotor for use in a dynamoelectric machine having a stator, the steps of forming an annular cage of magnetic material having a high magnetic retentivity during the continuance of a low reluctance magnetic path and having substantially reduced retentivity upon the interruption of such path comprising a plurality of pole extensions connected by bridging portions located radially inwardly of the outer circumference of said pole extensions to form axially extending indentations in the circumference of said cage, bonding axially extending bars of non-magnetic material to adjacent said pole extensions of said cage within said indentations in overlying relation with said bridging portions, removing said bridging portions to leave adjacent edges of said pole extensions in circumferentially spaced relation forming air gaps of relatively high reluctance, mounting said cage on a permanent magnet, magnetizing the resulting structure in a magnetizing device, then inserting removable keeper bars of magnetic material in said air gaps between adjacent said pole extensions in flux by-passing relation therewith while said rotor is in said magnetic device to complete the magnetic circuit within said rotor, and removing said rotor from said magnetic device and inserting the same in said stator with said keeper bars in said air gaps.

15. The method of removing a permanent magnet rotor having internal passages between adjacent pole pieces from its operative position in the stator of a dynamoelectric machine having a casing and end shell member bolted thereto which comprises the steps of removing the bolts from said end shell and removing the same, inserting the bolts in said passages in flux by-passing relation therewith to establish a magnetic circuit entirely within the rotor, and thereafter withdrawing the rotor from said stator with said bolts in position in said passages.

16. The method of removing a permanent magnet rotor having internal passages between adjacent pole pieces from the stator of a dynamoelectric machine having a casing and end shell members bolted thereto which comprise the steps of removing the bolts from said end shell, withdrawing the end shell from one end of said casing, inserting said bolts into said passages in the rotor between adjacent pole pieces and in magnetic contact therewith for establishing a low reluctance flux path entirely within the periphery of said rotor and without travel of a substantial part of the flux into the stator, said bolts being held in said passages under the force of magnetic attraction and providing for withdrawal of said rotor from said stator substantially free of magnetic attraction therebetween, and thereafter withdrawing said rotor from said stator with said bolts in said passages.

17. The method of removing a permanent magnet rotor having internal passages between adjacent pairs of pole pieces from the stator of a dynamoelectric machine which comprises the steps of removing the end shell from the dynamoelectric machine, inserting magnetic keeper bars in said passages within said rotor to establish a low reluctance magnetic path entirely within said rotor, said keeper bars being in magnetic contact with adjacent pole pieces and being held therein by magnetic attraction while substantially reducing the flux traversing said stator, and thereafter withdrawing said rotor from said stator with said keeper bars in place therein.

18. In a dynamoelectric machine of the character described having a casing including a pair of opposite end members, the combinatiton of a stator having a winding, through bolts of magnetic material for removably securing said end plates together with said stator within said casing, a rotor mounted for rotation within said stator and including a permanent magnet, pole extensions of magnetic material secured to said magnet in circumferentially spaced relation, said magnet and the side edges of said pole extensions having cooperating portions forming axially arranged air gaps through said rotor between each adjacent pair of poles, and each said gap being proportioned to receive one of said through bolts in contact with adjacent said pole extensions to form a flux by-pass therebetween for completing the magnetic circuit within said rotor independently of said stator during removal of said rotor from said stator or replacement thereof within said stator.

THOMAS W. MOORE.

References Cited in the file of this patent

UNITED STATES PATENTS

| Number | Name | Date |
|---|---|---|
| 1,195,861 | Smith | Aug. 22, 1916 |
| 1,460,759 | Kuhn-Frei | July 3, 1923 |
| 1,484,619 | Blake | Feb. 26, 1924 |
| 1,957,380 | Barlow | May 1, 1934 |
| 1,991,046 | Bohli | Feb. 12, 1935 |
| 2,024,745 | Reynders | Dec. 17, 1935 |
| 2,038,419 | Cotterman | Apr. 21, 1936 |
| 2,078,805 | Merrill | Apr. 27, 1937 |
| 2,153,563 | Hubacker | Apr. 11, 1939 |
| 2,187,033 | Hubacker | Jan. 16, 1940 |
| 2,255,477 | Tognola | Sept. 9, 1941 |
| 2,279,846 | Stapleton | Apr. 14, 1942 |
| 2,354,551 | Sawyer | July 25, 1944 |
| 2,447,647 | Goodwin | Aug. 24, 1948 |